US005116184A

United States Patent [19]

Pellegrini

[11] Patent Number: 5,116,184

[45] Date of Patent: * May 26, 1992

[54] VEHICLE AND METHOD FOR COLLECTING RECYCLABLE WASTE MATERIALS

[76] Inventor: Louis A. Pellegrini, 1231 Thurston Ave., Los Altos, Calif. 94022

[ * ] Notice: The portion of the term of this patent subsequent to Dec. 24, 2008 has been disclaimed.

[21] Appl. No.: 563,748

[22] Filed: Aug. 3, 1990

Related U.S. Application Data

[63] Continuation of Ser. No. 423,829, Oct. 19, 1989, abandoned, which is a continuation of Ser. No. 277,474, Nov. 23, 1988, abandoned, which is a continuation of Ser. No. 53,205, May 23, 1987, abandoned.

[51] Int. Cl.[5] .................. B65G 67/04

[52] U.S. Cl. .................. 414/406; 220/909; 220/553; 296/24.1

[58] Field of Search .................. 414/406-409, 414/509-517, 786, 525.6; 296/24.1, 146, 183; 232/15, 30, 31, 27; 220/20, 909

[56] References Cited

U.S. PATENT DOCUMENTS

| | | | |
|---|---|---|---|
| 738,863 | 9/1903 | White | 296/56 |
| 2,258,988 | 10/1941 | LeLaurin | 414/513 |
| 2,606,675 | 8/1952 | Jones | 220/20 X |
| 3,300,128 | 1/1967 | Jasinski et al. | 232/30 X |
| 3,572,529 | 3/1971 | Anderson | 414/408 |
| 3,643,993 | 2/1972 | Asadurian | 220/1 T X |
| 4,113,125 | 9/1978 | Schiller | 414/512 X |
| 4,242,953 | 1/1981 | St. -Gelais | 100/100 |
| 4,328,988 | 5/1982 | Patterson et al. | 296/183 X |
| 4,373,849 | 2/1983 | Robinson | 414/408 |
| 4,453,879 | 6/1984 | Kelley et al. | 414/509 |
| 4,632,628 | 12/1986 | Kress et al. | 414/513 |
| 4,648,775 | 3/1987 | Verner | 414/408 X |
| 4,676,431 | 6/1987 | Teske et al. | 220/1 T X |

FOREIGN PATENT DOCUMENTS

| | | | |
|---|---|---|---|
| 3420058 | 12/1985 | Fed. Rep. of Germany | 414/408 |
| 3537546 | 4/1987 | Fed. Rep. of Germany | 414/512 |
| 2939 | of 1914 | United Kingdom . | |
| 2165814A | 4/1986 | United Kingdom . | |

*Primary Examiner*—David A. Bucci

*Attorney, Agent, or Firm*—Townsend and Townsend

[57] ABSTRACT

A truck, trailer or other vehicle and a method of collecting recyclable materials are disclosed in which such materials are kept segregated in a container, box or otherwise near a home or an apartment, then the materials not originally placed in a container are so placed and then the container is lifted and moved to a position at which it is inverted and emptied of its materials, while still segregated, into respective compartments on the vehicle. The vehicle has a bed, a pair of outer side walls, and inner walls for defining a plurality of compartments extending longitudinally of the vehicle. Each compartment is adapted for receiving a specific recyclable material. Each compartment has a ram for forcing the materials out of the compartment through an access opening. The container is provided with front access openings to permit recyclable materials to be put into respective compartments of the container. A swingable top on the container opens by gravity when the container has been lifted and inverted and the compartments of the container are automatically aligned with the respective compartments in the vehicle.

13 Claims, 5 Drawing Sheets

VEHICLE AND METHOD FOR COLLECTING RECYCLABLE WASTE MATERIALS

This application is a continuation of application Ser. No. 07/423,829, filed Oct. 19, 1989, now abandoned, which was a continuation of Ser. No. 07/277,474, filed Nov. 24, 1988, now abandoned, which was a continuation of application Ser. No. 07/053,205, filed May 23, 1987, now abandoned.

This invention relates to improvements in the collection of waste materials, and more particularly, to a vehicle and method for collecting recyclable waste materials, such as metal cans, newspapers and glass bottles and jars.

BACKGROUND OF THE INVENTION

It is well known to collect various types of recyclable materials, such as metal cans, newspapers and glass jars and bottles. Generally, these materials are collected by having home owners or apartment dwellers place such materials in adjacent but separate piles, such as placing the cans and jars in respective bags or baskets and the newspapers in paper sacks adjacent to the sacks or baskets of cans and jars. A truck and/or trailer is typically driven past a home or an apartment where such materials have been collected and segregated, and the driver of the truck and/or trailer or his helper loads the segregated materials by hand in separate bins in the truck and/or trailer. Then the truck and/or trailer is driven to the next home or apartment and the collection step is repeated.

The truck or trailer typically has an open top which is at least five feet above the ground level. A workman loading the truck or trailer must lift the recyclable materials at least this five feet distance to cause the materials to be dumped into the truck or trailer. This requires a considerable amount of effort which causes fatigue and saps the strength of the workmen during a normal workday.

This procedure usually requires one or two workmen, one to drive the vehicle and/or load and one to ride along with the vehicle and do the manual labor of picking up the recyclable materials and loading them in the respective bins of the truck or trailer. This procedure also is time consuming and labor intensive and requires frequent unloading of the truck or trailer in which the recyclable materials are placed because of the limited volume of the truck or trailer.

Attempts have been made to provide for improved vehicles for collecting such materials. For the most part, such attempts have been unsatisfactory for one or more reasons. One such attempt is disclosed in U.S. Pat. No. 4,242,953, wherein a garbage collecting truck has two separate compartments for receiving recyclable materials. One compartment is adapted to receive paper, fabric and the like while the other compartment is adapted to receive non-recyclable wastes. Thus, the truck is not designed to segregate the recyclable materials. A first compartment of the truck is inclined forwardly of the truck, there being a piston and cylinder assembly for use in pressing waste into the front end of the first compartment. The truck has a second compartment and a piston and cylinder assembly to compress the waste material in the second compartment. An access door is provided to allow the materials to be forced out of the second compartment. The main drawback of the truck of this patent is the fact that only one compartment is provided for recyclable material. Thus, recyclable materials cannot be kept segregated from each other in the first compartment.

Because of the problems associated with conventional techniques and with attempts to improve the process of collecting recyclable waste materials, a need exists for improvements in recyclable material collection procedures. The present invention satisfies this need.

SUMMARY OF THE INVENTION

The present invention is directed to a truck, trailer or other vehicle and a method of collecting recyclable materials wherein such materials are kept segregated in a container or box near a home or an apartment, then the container when full or partially full of the materials, is lifted and moved to a position at which it is inverted and emptied of its materials, while still segregated, into respective compartments on the vehicle. Then the emptied container is placed back on the ground in a position to again receive segregated recyclable materials. To load the container, a workman need only to lift a basket or sack containing the materials a short distance, such as 18 to 24 inches. Thus, the container is much easier to use than the prior art truck or trailer mentioned above.

The vehicle is provided with a bed, a pair of outer side walls, and inner wall means interiorly of the outer side walls for defining a plurality of compartments extending longitudinally of the vehicle. Each compartment is adapted for receiving a specific recyclable material.

Each compartment has a blade extending the entire height of the compartment, each blade hereinafter referred to as a ram. Each ram is moveable through the respective compartment longitudinally of the vehicle for compressing the materials in the compartment and also for forcing the materials out of the compartment through an access opening when the vehicle is at a processing facility. In a preferred embodiment of the vehicle, the access opening is at the rear of the vehicle and the access opening is closed by one or more swingable doors.

The vehicle has a top provided with an opening through which the segregated recyclable materials are directed when the container is lifted by side arms pivotally mounted on the vehicle. The container itself is provided with front access openings to permit recyclable materials to be put into respective compartments of the container. A swingable top on the container opens by gravity when the container has been lifted by the side arms of the vehicle and the compartments of the container are then automatically aligned with respective compartments in the vehicle so that the compartments in the vehicle will receive specific recyclable materials falling from the container.

Another aspect of the invention is an improved container for use in collecting recyclable materials where a number of home owners or apartment dwellers would be using a common waste collection area. Such a container is a closed box having a number of compartments for receiving the recyclable materials in segregated fashion. The container has a hinged cover or top which closes the container but which has access doors that swing out to open a specific compartment, each door having a plate interiorly of the compartment associated with the door for blocking any manual access to the interior of the container. When the doors open, the plate is in a horizontal location so that the plate blocks entry to the compartment. When the doors close, the plate becomes generally vertical and any materials on the plate will drop in the compartment. The container, therefore, has a relatively large volume for use with a number of different homes or apartments in a common service area to permit collection of a large amount of recyclable material before the container must be emptied into the vehicle of the present invention.

The primary object of the present invention is to provide an improved vehicle and method of collecting recyclable waste materials wherein the materials are first received in a container having separate compartments for the materials and the container is lifted by arms on the vehicle to a position in which the container is inverted so that the segregated recyclable materials therein will be directed into specific compartments on the vehicle, following which the materials can periodically be compacted by ram means provided on the vehicle so that the vehicle will receive and haul a large volume of segregated recyclable materials and the materials can be removed from the vehicle while remaining segregated at all times.

Another object of the present invention is to provide a container having compartments for receiving and collecting recyclable materials whereby the container can be lifted and inverted to dump the segregated contents thereof into compartments on the vehicle of the type described whereby the recyclable material can be kept segregated at all times and collected in a minimum of time and with a minimum expenditure of effort.

Other objects of this invention will become apparent as the following specification progresses, reference being had to the accompanying drawings for an illustration of the invention.

IN THE DRAWINGS

PREFERRED EMBODIMENT OF THE INVENTION

Figure 1:
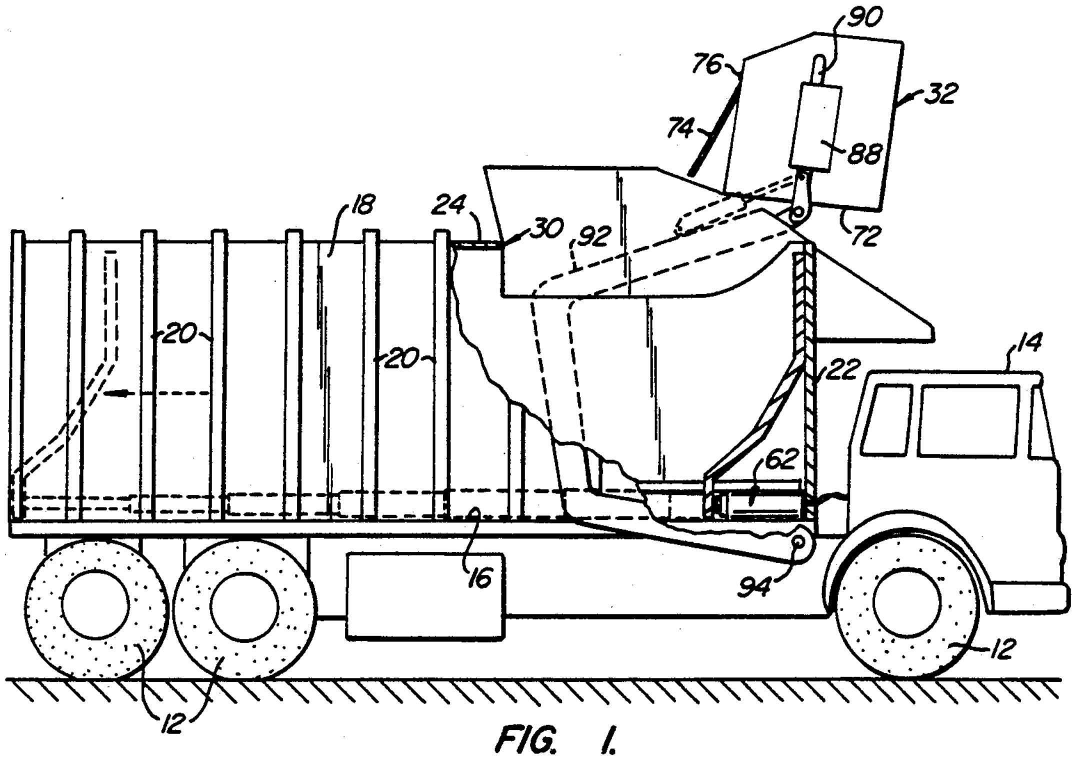
FIG. 1 is a side elevational view of a vehicle for collecting recyclable waste showing a waste pick-up container in position for dumping segregated waste materials into compartments of the vehicle, parts being broken away and in section to illustrate details of construction.

The waste pick-up vehicle of the present invention is broadly denoted by the numeral 10 and, for purposes of illustration, will hereinafter be considered a truck. The vehicle could be a trailer or other conveyance instead of a truck. Truck has ground-engaging wheels 12, a cab 14 and a bed 16. The bed also has a pair of spaced outer side walls 18 which are reinforced by vertical ribs 20, a front wall 22 and a top wall 24. A pair of access doors 26 are hingedly mounted on the rear marginal edges of sides 18 for opening and closing a rear dump opening 28. Top wall 24 is cut away near the front portion thereof to define a dump opening 30 (FIG. 1) for receiving segregated recyclable waste materials from a pick-up container or box 32 which is dumped in the manner shown in FIG. 1. Box 32 will be described hereinafter. Opening 30 extends forwardly from the front edge of top 24 to front wall 22 and opening 30 extends to the sides 18.

Figure 2:
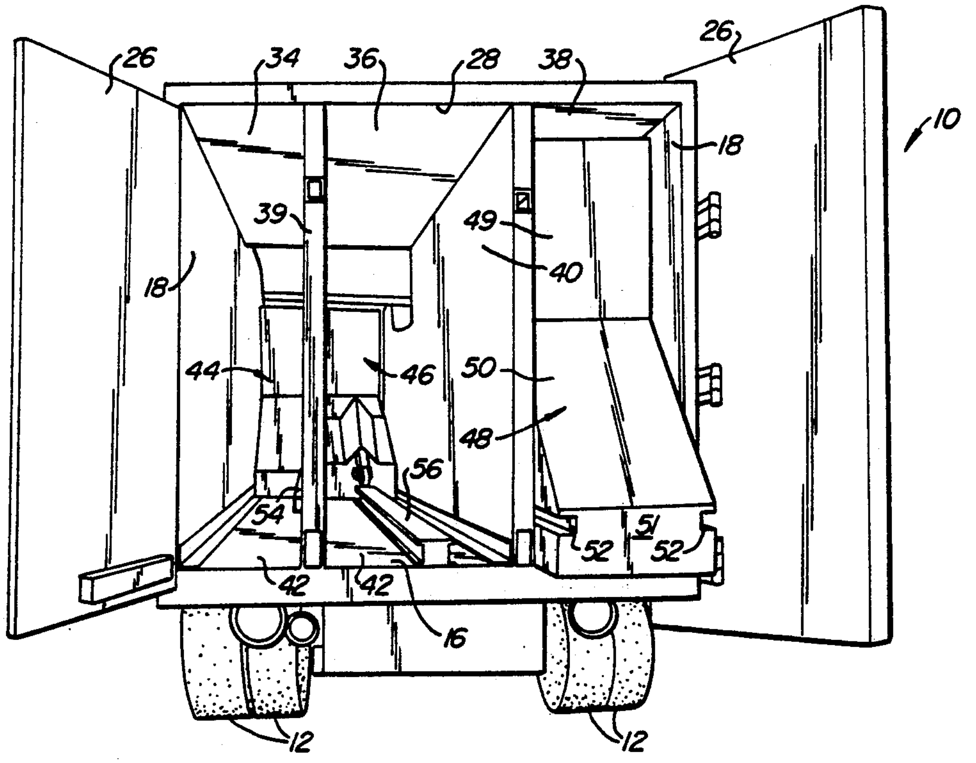
FIG. 2 is a perspective view of the rear end of the vehicle of FIG. 1, showing the rear access doors in open condition and illustrating the compartments of the vehicle with rams for compacting the waste in respective compartments.

The bed of the truck 10 is divided into three compartments 34, 36 and 38 as shown in FIG. 2. Compartment 34 is formed by one side 18 and a vertical partition 39. Compartment 36 is formed by partition 39 and a second partition 40 spaced laterally from partition 39. Compartment 38 is formed by the other side 18 and partition 40. Partitions 39 and 40 extend from the rear opening 28 of the vehicle to the front wall 22. Partitions 39 and 40 also extend from the floor 42 of the bed 16 to top wall 24. Thus, the contents of the three compartments 34, 36 and 38 are essentially isolated from each other.

Compartments 34, 36 and 38 are provided with respective rams 44, 46 and 48. The rams are essentially the same in construction and each ram includes an upper plate 49 which is generally vertical and a lower plate 50 which is slightly inclined downwardly and rearwardly as shown in FIG. 2. Each ram has typically some type of guide means. For instance, ram 48 has a pair of longitudinal grooves 52 on the opposite sides thereof which mate with guide rails, such as rail 54 in the bottom of compartment 34, only one of which is shown on one side surface of partition 39. Ram 46, for instance, has a rail 56 on bottom surface 42 along which ram 46 is moveable. The rams can move rearwardly sufficiently far to force all of the contents out of the respective compartments and out of the rear opening 28 when the doors 26 are open as shown in FIG. 2.

Each ram has a lower, vertical plate 51 which is an extension of the rear marginal edge of plate 50 as shown in FIG. 2. The upper marginal edge of plate 49 of each ram is near the lower surface of top 24.

Figure 4:
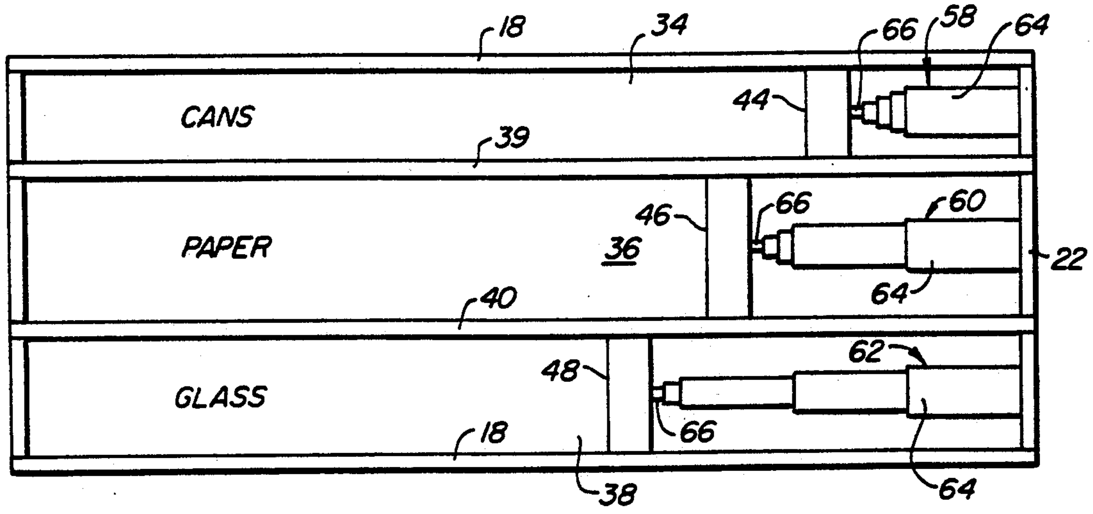
FIG. 4 is a schematic view of the three compartments of the vehicle, showing the individual rams for compacting the materials in respective compartments.
Figure 5:
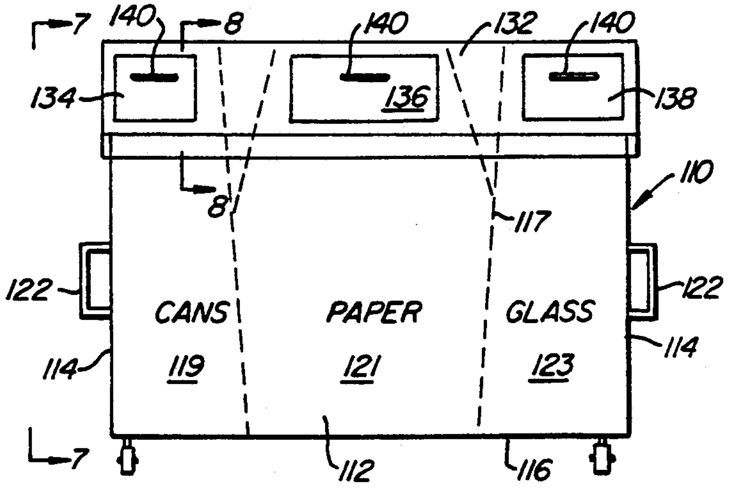
FIG. 5 is a front elevational view of a waste container suitable for residential or apartment use and provided with waste material receiving compartments and access openings closed by swingable doors.

Rams 44, 46 and 48 have power devices 58, 60 and 62 (FIGS. 1 and 4) for urging the corresponding rams rearwardly. Each power device includes a fluid actuated piston and cylinder assembly including a cylinder 64 and a piston 66 coupled to the corresponding cylinder. The front end of each cylinder 64 is coupled in some suitable manner to front wall 22 and fluid lines, such as hydraulic fluid lines, are coupled to each of the power devices and controlled from the cab 14 of vehicle 10. The power devices 58, 60 and 62 are independently controllable so that each of the rams can be moved relative to the other rams as is desired or deemed necessary. The extension of each piston 66 is sufficient to force the corresponding ram to the rear open end 28 of the vehicle bed 16.

Figure 2A:
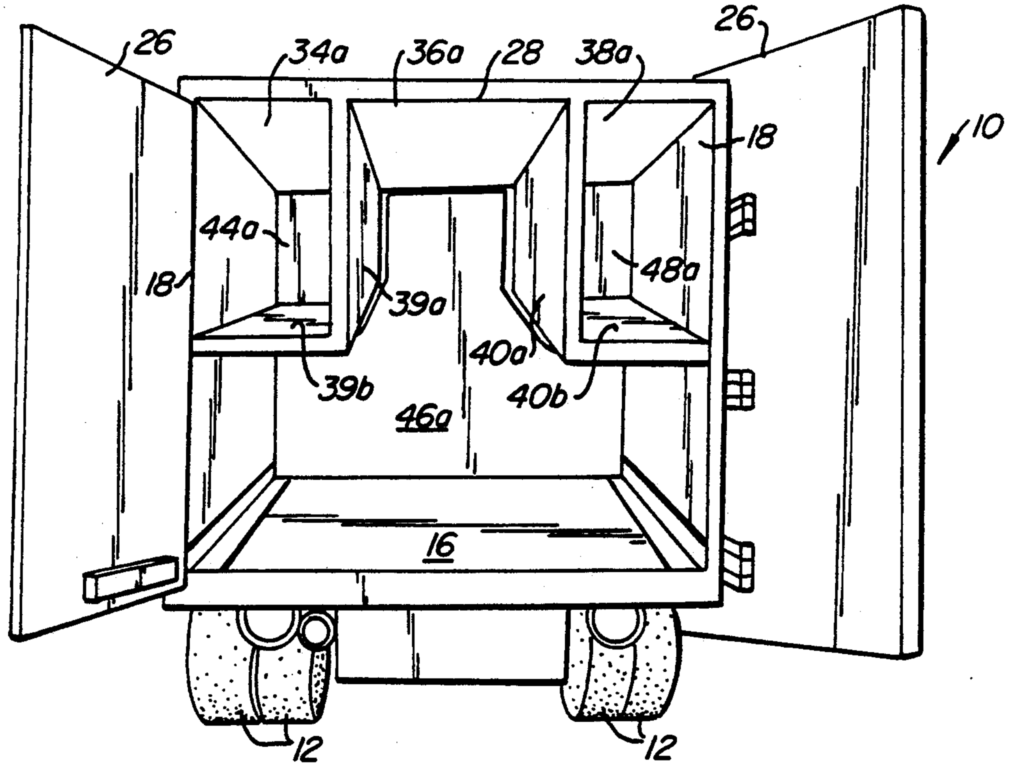
FIG. 2A is a view similar to FIG. 2 but showing another embodiment of the compartments.
Figure 2B:
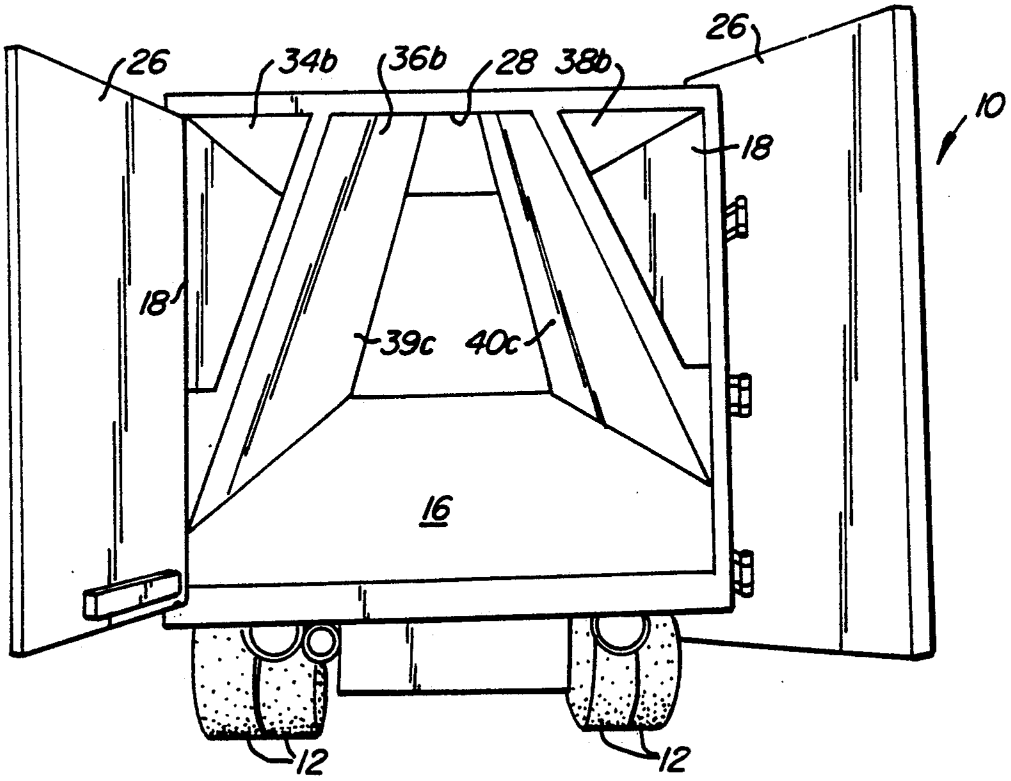
FIG. 2B is a view similar to FIG. 2A but showing still a third embodiment of the compartments.

FIGS. 2A and 2B show different ways in which the compartments can be formed. In FIG. 2A, compartment **34*a* can be formed from a vertical wall 39*a* and a floor 39*b*. Compartment 38*a* is formed by a vertical wall 40*a* and a floor 40*b*. Floors 39*b* and 40*b* are above the bed 16 of the truck. The arrangement as shown in FIG. 2A increases the volume of compartment 36*a*. This arrangement of the compartments is desirable because paper comprises a larger percentage of the volume of recyclable materials collected than either glass or metal cans. Also, compartments 34*a*, 36*a* and 38*a* will have rams 44*a*, 46*a* and 48*a*. Rams 44*a* and 48*a* will each have fluid piston and cylinder assembly (not shown) which is elevated with reference to the bed 16. The fluid piston and cylinder assembly for ram 46*a* will typically be at the lower portion of ram 46*a*, such as resting on bed 16**.

FIG. 2B shows another configuration of the walls defining compartments **34*b*, 36*b* and 38*b*. As shown in FIG. 2B, inclined walls 39*c* and 40*c* are provided to define the compartments. Rams are provided for compartments 34*b*, 36*b* and 38*b*** as described above with respect to the other embodiments of FIG. 2 and 2A.

Figure 2C:
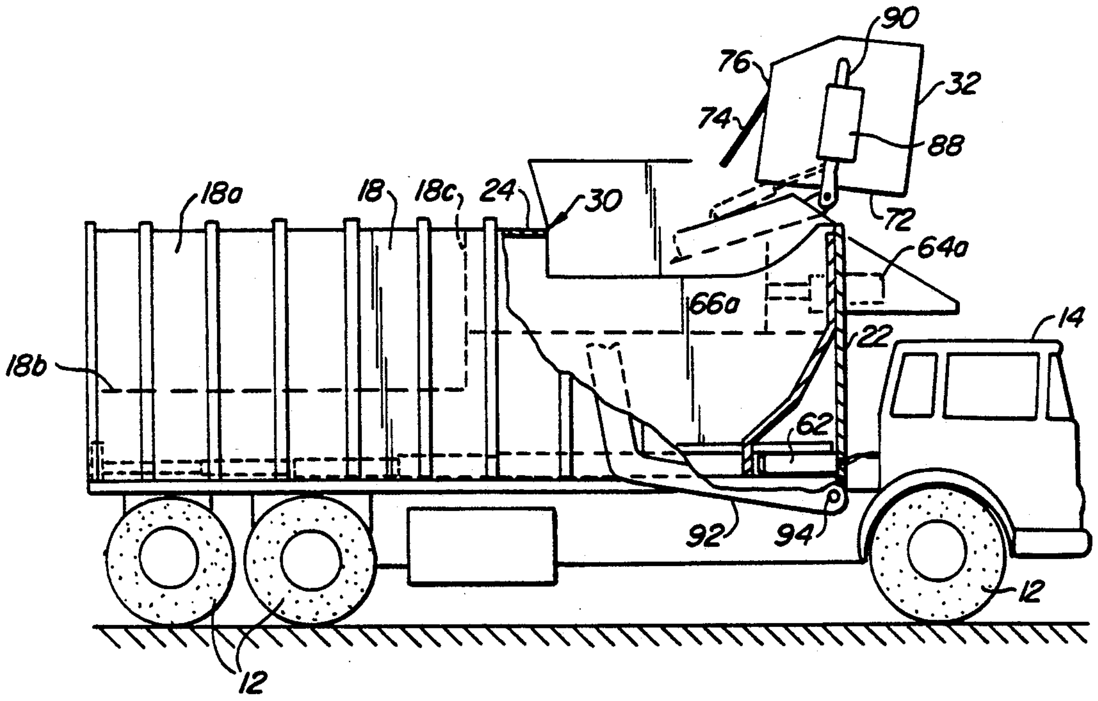
FIG. 2C is a view similar to FIG. 1 but showing an access door at one side of the vehicle.

FIG. 2C shows a side door **18*a* for each side 18, respectively, the doors 18*a* being hinged along a hinge line 18*b* (FIG. 2C) for opening to the side to unload waste materials in corresponding, adjacent compartments 34*a* and 38*a* of the type shown in FIG. 2A and compartments 34*b* and 38*b* shown in FIG. 2B. Some suitable means (not shown) is provided to releasably lock doors 18*a*** in place, yet the doors can be opened as desired to unload the contents of the adjacent compartments.

As shown in FIG. 2C, a power device **64*a* is provided for each of compartments 34*a* and 38*a*, respectively. The power devices operate rams 66*a* which need to travel only the distance equal to the distance to the upright side 18*c* of the adjacent door 18*a***. In this way, less expensive and lighter power devices and rams can be used with the structure of FIG. 2C, thus providing cost savings and accommodating weight limitations.

Figure 3:
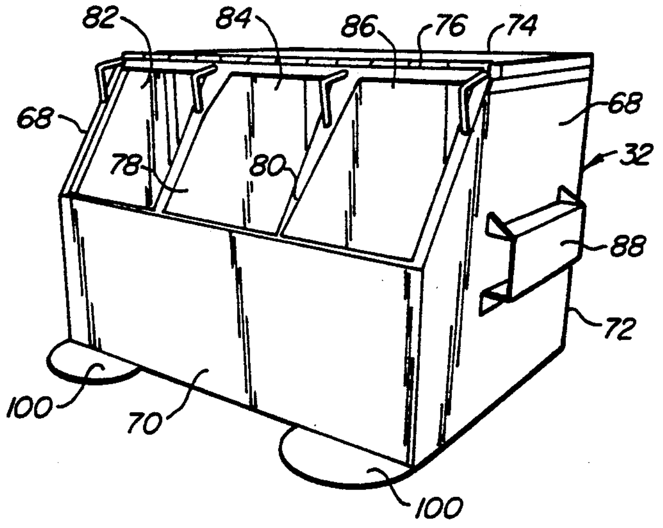
FIG. 3 is a perspective view of the collection container or box which is partitioned to receive recyclable waste material and to be used with the vehicle of FIGS. 1 and 2.

Vehicle 10 is adapted to be used with waste material pick-up container 32 as shown in FIGS. 1 and 3. Container 32 includes a pair of spaced sides 68, a front wall 70, a rear wall 72, and a hinged top wall 74 pivotally mounted by hinge 76 on the upper margins of sides 68. Container 32 has vertical partitions 78 and 80 which extend from front wall 70 to rear wall 72, and partitions 78 and 80 cooperate with sides 68 to define compartments 82, 84 and 86. Such compartments are adapted to receive recyclable materials of different types. For instance, compartment 82 is adapted to receive metal cans, compartment 84 is adapted to receive newspapers, and compartment 86 is adapted to receive glass bottles and jars.

Sides 68 of container 32 have guides 88 thereon for receiving blades 90 (FIG. 1) on the outer ends of C-shaped arms 92 which are pivotally mounted by means of a shaft 94 on vehicle 10 as is conventionally known. Blades 90 enter the guides 88 when the blades are forwardly of truck cab 14 and in lowered positions, generally aligned with guides 88.

In use, truck 10 has container 32 coupled to the blades 90 of arms 92 at all times. With one workman driving the vehicle and/or another workman riding on the container 32, the truck will move from place to place where recyclable materials are located, such as in the front of or on the street near homes or apartment units. The workman, if any in addition to the driver, riding on container 32 will stand on either one of the rigid plates 100 on the front of the container as shown in FIG. 3.

When the truck stops near a home for curbside collection, the driver or the workman riding on the container will move to the location where the recyclable materials are located and, for instance, place metal cans in compartment 82, newspapers in compartment 84 and glass bottles and jars in compartment 86 of container 32. It may take several stops before compartments 82, 84 and 86 are filled. When the compartments are filled, the driver of the truck will operate controls which will elevate container 32 as shown in FIG. 1 sufficiently so that top cover 74 will pivot rearwardly and open the top of container 32, whereupon the recyclable materials in compartments 82, 84 and 86 will drop through opening 30 into respective compartments 34, 36 and 38, assuming that rear doors 26 of the vehicle are closed.

FIGS. 5 through 8 show waste collecting containers broadly denoted by the numeral 110 which are suitable for apartment complexes serving a number of different occupants to whom recyclable collection is currently either unavailable or inefficient. Container 110 has a box-like construction including a front wall 112, a pair of side walls 114, a bottom wall 116, and a swingable top 118 with hinges is mounted on the sides 114. Guides 122 are provided on sides 114 for receiving blades 90 (FIG. 1) of truck 10.

The top 118 has a pair of angled side walls 130 and a front wall 132, front wall 132 having three pivotal closure members 134, 136 and 138. These are manually opened by handles 140 and each of the closure members has an interior plate 142 (FIG. 8) associated therewith. Thus, upon opening closure member the plate 142 assumes the dashed line position of FIG. 8, thereby blocking any access to the interior of the corresponding compartments 117. Thus, pilferage is minimized or eliminated and no person can gain access to the interior of the respective compartments by virtue of the blocking nature of plates 142.

When it is desired to empty the contents of container 110, the container is coupled to blades 90 of truck 10 by driving the truck into positions such that the blades enter guides 122. Then the container is elevated and tilted in the manner shown in FIG. 1, whereupon the materials in the various compartments 119, 121 and 123 of container 110 are emptied into respective compartments 34, 36 and 38 or compartments **34*a*, 36*a* and 38*a* or compartments 34*b*, 36*b* and 38*b* of truck 10, following which the container 110 is lowered back onto the surface and the truck moved in reverse and away from the container, following which the truck progresses forwardly to the next container 110. The waste materials collected in compartments 34, 36 and 38 are periodically compacted by operating power devices 58, 60 and 62 (FIG. 4) whereby the rams 44, 46 and 48 are individually and independently moved rearwardly to compact the materials in the respective compartments. When compartments 34, 36 and 38 are full, the truck is driven to a processing facility, doors 26 are open and the rams are forced rearwardly to empty the respective compartments 34, 36 and 38** of the materials therewithin. Then, the truck is ready to make additional rounds through residential or apartment neighborhoods for recyclable materials as set forth above. At the processing facility, the materials are kept separated as to type; thus, the present invention provides a simple means and method for collecting segregated recyclable materials and keeping them segregated during transport to the processing facility and while unloading the materials at the dump site itself.

Figure 9:
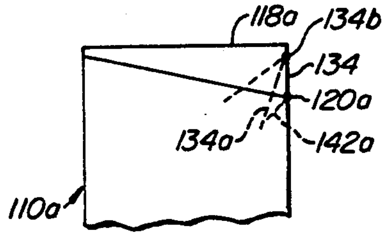
FIG. 9 is a fragmentary side elevational view of another embodiment of a container for receiving recyclable materials.
Figure 6:
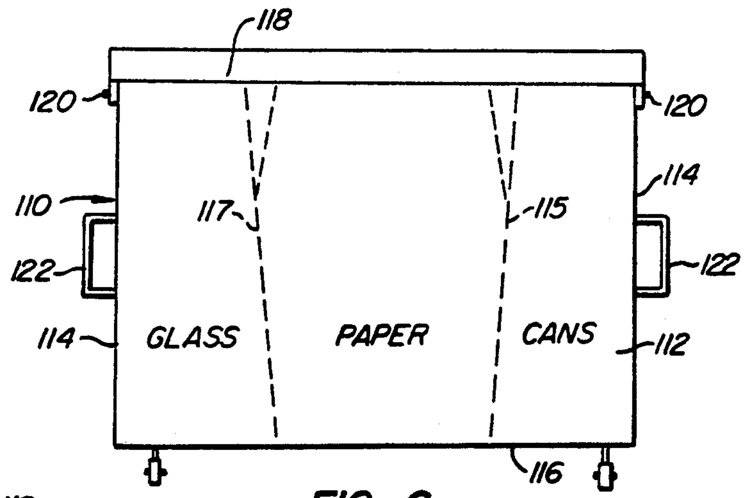
FIG. 6 is a rear elevational view of the container of FIG. 5.
Figure 7:
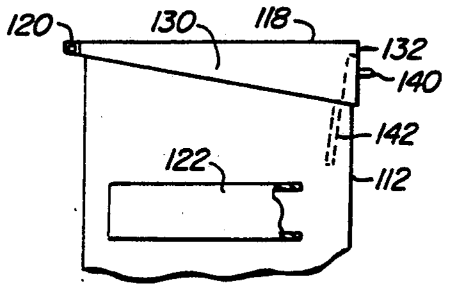
FIG. 7 is a side elevational view of the container of FIGS. 5 and 6 looking in the direction of lines 7—7 of FIG. 5.
Figure 8:
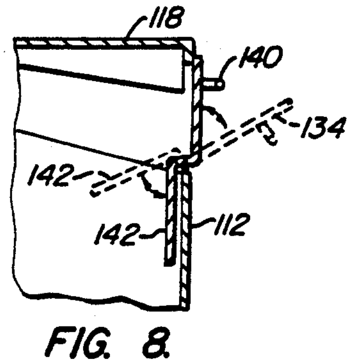
FIG. 8 is a fragmentary, cross-sectional view taken along line 8—8 of FIG. 5.

FIG. 9 shows a container 110*a* in which the top 118*a* is hinged to swing about a hinge 120*a* which is at the front of the container 110*a*. Thus, hinge 120*a* is on the container 110*a* oppositely from that hinge 120 on container 110 shown in FIG. 7.

Container 110*a* has three compartments for receiving recyclable materials. Each compartment has an access opening removably covered by a closure 134*a*. Each closure is hinged at location 134*b* so that the closure can swing to an open position and then back to a closed position. In its closed position, the closure engages an angled plate 142*a* which is used to inhibit pilferage of materials from the corresponding compartment.

I claim:

1. Apparatus for collecting recyclable waste materials comprising:

a vehicle having a bed, a top, a front end, a rear end, and vertical partition means extending longitudinally of the vehicle to a location near said rear end for defining a number of compartments on the bed, there being an access opening at the top near said front end through which segregated waste materials can be directed into respective compartments, said access opening near said front end being normally in a generally horizontal plane, there being exit opening means near the rear end through which waste materials can be directed out of the compartments, the partition means having an upper edge portion aligned with and sufficiently close to the access opening to cause segregated waste materials directed into the access opening to remain segregated as the waste materials are directed into the compartments, the partition means being the only means on the vehicle for dividing the bed into compartments, and the upper edge portion of the partition means being the only means for keeping waste materials segregated as the waste materials are directed into the compartments;

means near the front end for at least one compartment for forcing waste materials in the compartment longitudinally of the vehicle toward the exit opening means;

means for closing the exit opening means;

a waste material container having partition structure defining a number of compartments; and means on the vehicle near the front end thereof for elevating the waste material container into a position aligned with, above and in dumping relationship to the access opening with each compartment of the container being vertically aligned with a respective compartment of the vehicle, whereby segregated waste materials carried in the compartments of the container can be dumped into respective compartments of said vehicle.

2. Apparatus as set forth in claim 1, wherein said partition means includes as pair of spaced inner walls.

3. Apparatus as set forth in claim 2, wherein the walls extend to the bed.

4. Apparatus as set forth in claim 2, wherein the lower extremities of the inner walls are spaced above the bed.

5. In apparatus for collecting recyclable waste materials;

a vehicle having a bed, a top, a front end, a rear end, and vertical partition means extending upwardly from the bed and longitudinally of the vehicle to a location near said rear end for defining a number of compartments, there being an access opening to the top near said front end through which segregated waste materials can be directed into respective compartments, said access opening near said front end being normally in a generally horizontal plane, there being exit opening means near the rear end through which waste materials can be directed out of the compartments, the partition means having an upper edge portion aligned with and sufficiently close to the access opening to cause segregated waste materials directed into the access opening to remain segregated as the waste materials are received in the compartments, the partition means being the only mans on the vehicle for dividing the bed into compartments, and the upper edge portion of the partition means being the only means for keeping waste materials segregated as the waste materials are directed into the compartments;

said partition means being located to permit waste materials in the compartments to move longitudinally of the vehicle toward the exit opening means;

means for closing the exit opening means;

said vehicle adapted to be used with a waste material container having partition structure and defining a number of compartments; and means on the vehicle near the front end thereof for elevating the waste material container into a position aligned with, above and in dumping relationship to the access opening with each compartment of the container being vertically aligned with a respective compartment of the vehicle, whereby segregated recyclable waste materials carried in the compartments of the container can be dumped into respective compartments of said vehicle.

6. Apparatus as set forth in claim 5, wherein is included a container having wall mans therewithin for defining compartments for receiving waste materials, the container having an opening communicating with each compartment thereof, the compartments of the container being alignable with respective compartments of the vehicle.

7. Apparatus as set forth in claim 6, wherein is included a top opening on the container which is alignable with the access opening of the vehicle bed when the container is elevated by said elevating means, whereby the contents of the container will be directed into respective compartments of the vehicle.

8. Apparatus as set forth in claim 7, wherein is included a top closure pivotally mounted on the container for closing the top opening thereof.

9. Apparatus as set forth in claim 7, wherein the container has a front opening closed by closure members.

10. Apparatus as set forth in claim 9, wherein the closure members have internal plates thereon which move into horizontal positions when the closure members are opened to thereby prevent manual access to the interiors of the respective compartments of the container.

11. In apparatus for collecting recyclable waste materials;

a vehicle having a bed, a front end, and a rear end;

a partition means on the bed for forming a number of compartments, said partition means extending longitudinally of the vehicle and being located to cause the lower extremities of at least one of the compartments to be spaced above said bed, said vehicle having a top access opening near said front end for receiving waste materials therewithin, said access opening being in a generally horizontal plane, the partition means having an upper edge portion aligned with and adjacent to the access opening, there being exit opening means at the rear end for allowing the waste materials to move rearwardly in the compartments and to be removed therefrom;

means for closing the exit opening means;

ram means at said front end for forcing the recyclable materials in at least one of the compartments toward the exit opening; and means on the front end of the vehicle for elevating a container having compartments for waste materials therein to a position above and aligned with the access opening in dumping relationship thereto, whereby recyclable waste materials from the container can be moved into respective compartments on the bed.

12. In apparatus as set forth in claim 11, wherein is included a container having wall means therewithin for defining compartments for receiving waste materials, the container having an opening communicating with each compartment thereof, the compartments of the container being alignable with respective compartments of the vehicle.

13. In apparatus for collecting recyclable waste materials:

a vehicle having a bed, a front end, and a rear end;

a pair of spaced, partitions on the bed for forming a central compartment and a pair of side compartments, said partitions extending longitudinally of the vehicle, the lower extremities of the side compartments being spaced above said bed, said vehicle having a top access opening near said front end for receiving recyclable waste materials therewithin, said access opening being in a generally horizontal plane, the partitions having upper edge portions aligned with and adjacent to the access opening, there being exit opening means at the rear end for allowing the recyclable waste materials in the compartments to be removed therefrom;

means for closing the exit opening means, said partition means being located to permit waste materials in said compartments to move longitudinally of the vehicle toward the exit opening means;

a waste material container having partition structure defining a number of compartments; and means on the front end of the vehicle for elevating the container to a position above and aligned with the access opening in dumping relationship thereto, whereby recyclable materials from the container can be moved into respective compartments of the bed.

* * * * *